United States Patent
Linzer

(10) Patent No.: US 9,336,572 B1
(45) Date of Patent: May 10, 2016

(54) TEMPORAL FILTERING WITH LOCAL NEIGHBORHOOD LIMITATIONS

(71) Applicant: Ambarella, Inc., Santa Clara, CA (US)

(72) Inventor: Elliot N. Linzer, Bergenfield, NY (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 14/595,562

(22) Filed: Jan. 13, 2015

(51) Int. Cl.
*G06K 9/40* (2006.01)
*G06T 5/00* (2006.01)
*G06T 5/10* (2006.01)

(52) U.S. Cl.
CPC .. *G06T 5/002* (2013.01); *G06T 5/10* (2013.01)

(58) Field of Classification Search
USPC .............. 382/260, 162, 219, 254; 250/214 R; 345/659, 690; 348/607, 699; 375/240.12, E7.04
See application file for complete search history.

(56) References Cited

U.S. PATENT DOCUMENTS

| | | | | |
|---|---|---|---|---|
| 5,128,756 A * | 7/1992 | Johnston | ................ | H04N 19/50 348/607 |
| 6,137,904 A * | 10/2000 | Lubin | ................ | G06T 5/50 382/162 |
| 6,360,022 B1 * | 3/2002 | Lubin | ................ | G06T 5/50 375/E7.04 |
| 8,440,957 B2 * | 5/2013 | Dierickx | ................ | G01T 1/17 250/214 R |
| 8,665,952 B1 * | 3/2014 | Grange | ............ | H04N 19/00575 375/240.12 |

\* cited by examiner

*Primary Examiner* — Anh Do
(74) *Attorney, Agent, or Firm* — Christopher P. Maiorana, PC

(57) ABSTRACT

A method for temporal filtering with local neighborhood limitations is disclosed. Step (A) of the method may perform a temporal filter operation on a target sample in a current picture of a sequence of pictures to generate an intermediate value of the target sample. Step (B) may find a minimum value and a maximum value among a plurality of local samples in a local neighborhood in the current picture around the target sample. The minimum value and the maximum value generally bound a minimum/maximum range. Step (C) may adjust the intermediate value toward the minimum/maximum range to generate a final value of the target sample if the intermediate value is outside a limited range. The limited range is generally based on the minimum/maximum range.

18 Claims, 5 Drawing Sheets

TEMPORAL FILTERING WITH LOCAL NEIGHBORHOOD LIMITATIONS

FIELD OF THE INVENTION

The present invention relates to temporal filtering generally and, more particularly, to temporal filtering with local neighborhood limitations.

BACKGROUND OF THE INVENTION

Noisy video commonly has large frame-to-frame differences, even in still areas and correctly modeled moving areas. Conventional temporal filters base the strength of the filtering on the frame-to-frame differences in order to filter non-moving parts more strongly. When the filters are operated so that most still areas receive the strong temporal filtering, some moving areas are inevitably filtered with a strong motion compensated temporal filtering that uses a large percentage of a reference picture. The strong filtering in the moving areas results in visible motion artifacts.

It would be desirable to implement temporal filtering with local neighborhood limitations.

SUMMARY OF THE INVENTION

The present invention concerns a method for temporal filtering with local neighborhood limitations. Step (A) of the method may perform a temporal filter operation on a target sample in a current picture of a sequence of pictures to generate an intermediate value of the target sample. Step (B) may find a minimum value and a maximum value among a plurality of local samples in a local neighborhood in the current picture around the target sample. The minimum value and the maximum value generally bound a minimum/maximum range. Step (C) may adjust the intermediate value toward the minimum/maximum range to generate a final value of the target sample if the intermediate value is outside a limited range. The limited range is generally based on the minimum/maximum range.

The objects, features and advantages of the present invention include providing temporal filtering with local neighborhood limitations that may (i) reduce visible filter-induced artifacts in moving areas, (ii) maintain a significant amount of noise filtering in the moving areas, (iii) prevent large filtered excursions from the samples in the local area, (iv) use different sizes of the local areas in different iterations, (v) use different limits to the excursions in the different iterations and/or (vi) use different shapes of the local areas.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Embodiments of the present invention generally provide a technique to reduce visible motion artifacts without a significant decrease in noise reduction. A local neighborhood around a target sample (or pixel) of a current picture (e.g., frame or field) undergoing a motion compensated temporal filter (e.g., MCTF) operation may be examined. Amplitudes of current local samples in the local neighborhood are generally used to limit a range of a largest potential value and a smallest potential value of a post-filtered target sample value.

In various embodiments, the range limit may be expanded by one or more user-controlled input values. The expanded range may be symmetrical to higher values and to lower values in some cases and asymmetrical in other cases. In some embodiments, the limitation imposed on the post-filtered target sample may be determined by multiple iterations of multiple local neighborhood limitations. For example, a size, a shape and an expanded range (e.g., the input values) of an initial local neighborhood may be used in an initial iteration. A different size, a different shape and/or a different expanded range of a different local neighborhood may be used in a subsequent iteration. Larger neighborhoods with small excursions generally maintain the post-filtered target sample value proximate to the sample values in the background. Smaller neighborhoods with large excursions generally permit an extraordinary post-filtered target sample value to stand out from the background.

Figure 1:
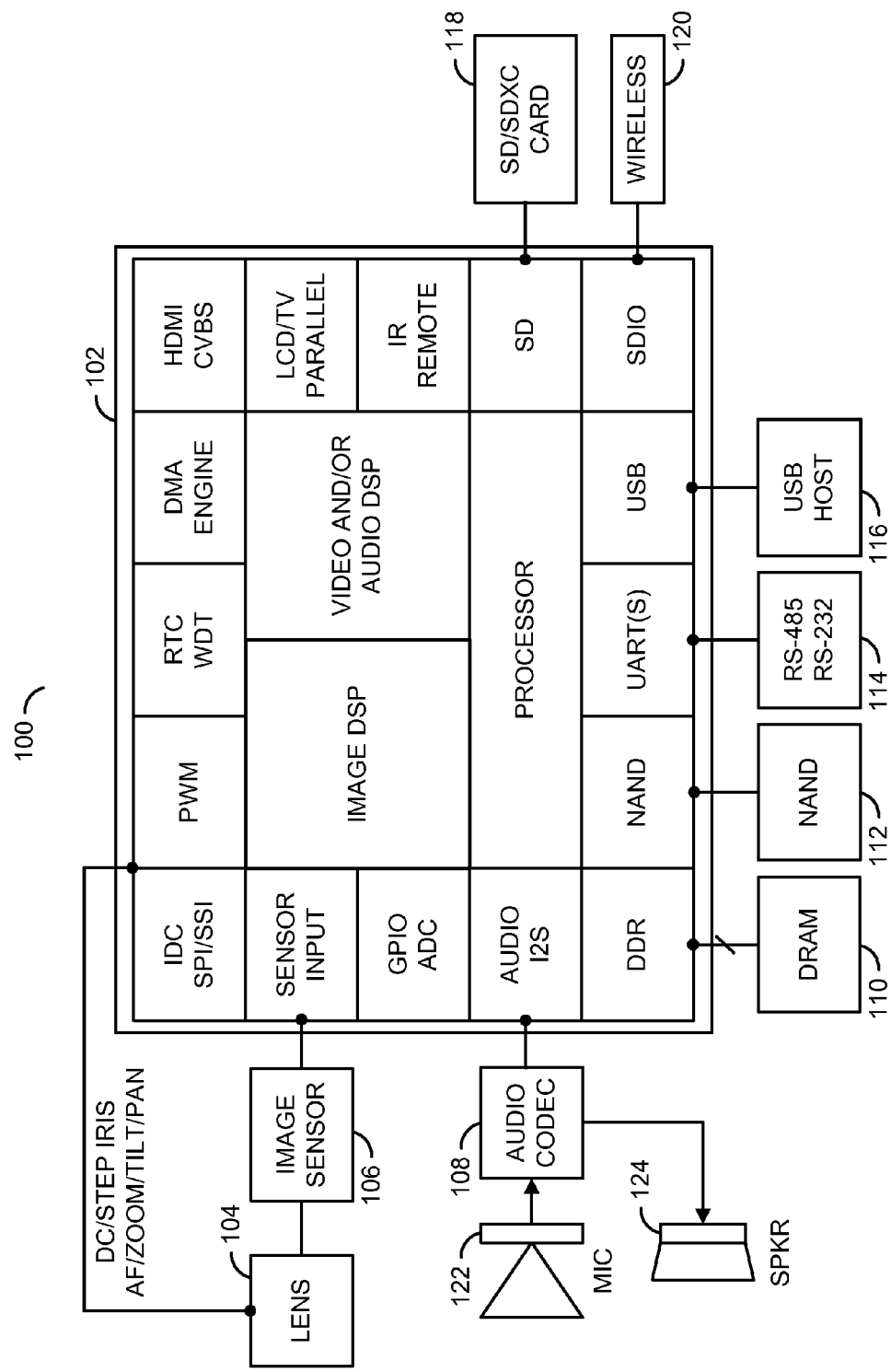
FIG. 1 is a block diagram of a camera system.

Referring to FIG. 1, a block diagram of a camera system 100 is shown illustrating an example implementation of a camera/recorder system (or apparatus). In some embodiments, the camera system 100 may be a digital video camera, a digital still camera or a hybrid digital video/still camera. In an example, the electronics of the camera system 100 may be implemented as one or more integrated circuits. For example, an application specific integrated circuit (e.g., ASIC) or system-on-a-chip (e.g., SOC) may be used to implement a processing portion of the camera system 100. In various embodiments, the camera system 100 may comprise a camera chip (or circuit) 102, a lens assembly 104, an image sensor 106, an audio codec 108, dynamic random access memory (e.g., DRAM) 110, nonvolatile memory (e.g., NAND flash memory, etc.) 112, one or more serial interfaces 114, an interface 116 for connecting to or acting as a universal serial bus (e.g., USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an ethernet cable, or wireless link).

In various embodiments, the circuit 102 may comprise a number of modules (or circuits) including, but not limited to, a pulse width modulation (e.g., PWM) module, a real time clock and watchdog timer (RTC/WDT), a direct memory access (e.g., DMA) engine, a high-definition multimedia interface (e.g., HDMI), an LCD/TV/Parallel interface, a general purpose input/output (e.g., GPIO) and an analog-to-digital converter (e.g., ADC) module, an infrared (e.g., IR) remote interface, a secure digital input output (e.g., SDIO) interface module, a secure digital (e.g., SD) card interface, an audio I²S interface, an image sensor input interface, and a synchronous data communications interface (e.g., IDC SPI/SSI). The circuit 102 may also include an embedded processor (e.g., ARM, etc.), an image digital signal processor (e.g., DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (e.g., IEEE) 802.11, IEEE 802.15, IEEE 802.15.1, IEEE 802.15.2, IEEE 802.15.3, IEEE 802.15.4, IEEE 802.15.5, and/or IEEE 802.20. The circuit 102 may also include support for communicating using one or more of the universal serial bus protocols (e.g., USB 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors of the circuit 102) implementing a temporal filtering with local neighborhood limitations in accordance with an embodiment of the invention may be stored in one or more of the memories 110 and 112. When executed by the circuit 102, the programming code generally causes the circuit 102 to receive a sequence of pictures from the sensor 106, perform a temporal filter operation on a target sample in a current picture of the sequence to generate an intermediate value of the target sample, find a minimum value and a maximum value among multiple local samples in a local neighborhood in the current picture around the target sample, the minimum value and maximum value may bound (or establish) a minimum/maximum range, and adjust the intermediate value toward the minimum/maximum range to generate a final value of the target sample if the intermediate value is outside a limited range. The limited range may be based on the minimum/maximum range. The local neighborhood limitations imposed on each temporal filtered target sample may be based on one or more local neighborhoods and/or one or more excursion ranges. In some embodiments, the temporal filter operation may be implemented as a motion compensated temporal filter operation.

Figure 2:
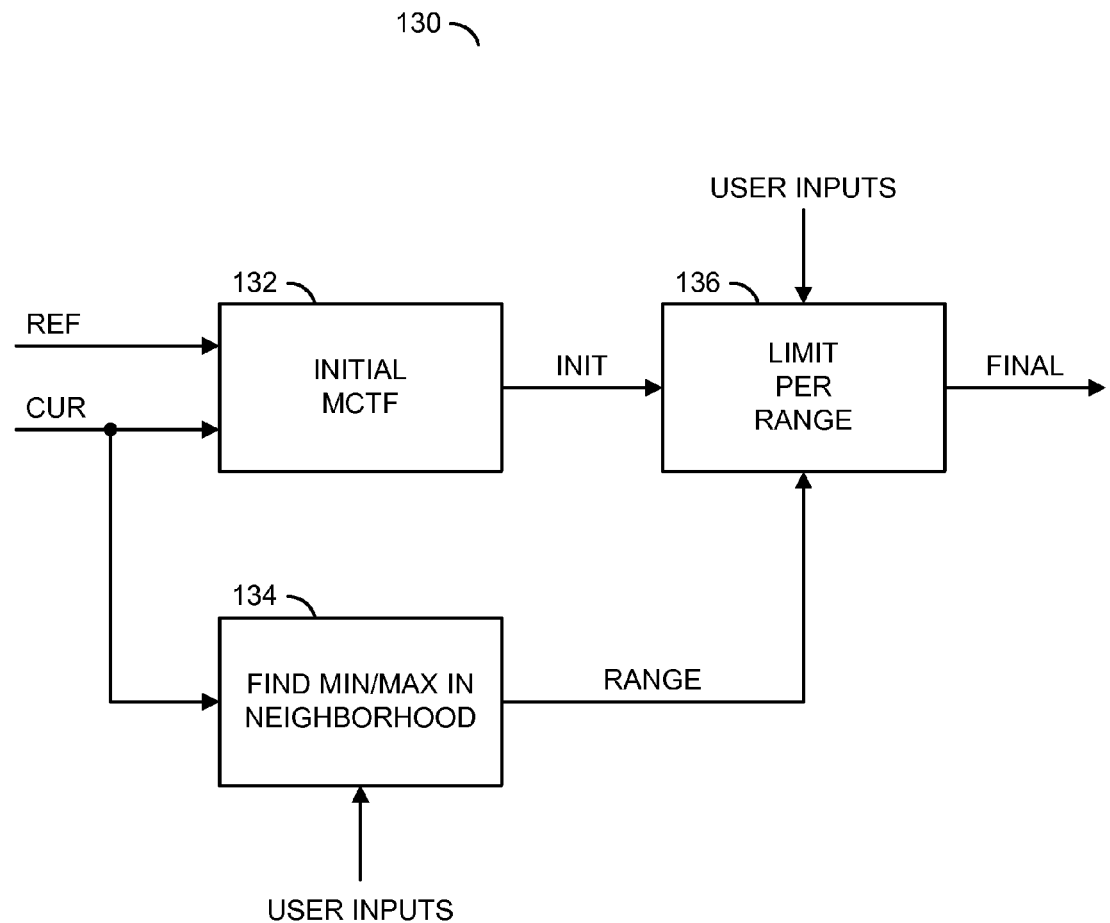
FIG. 2 is a functional flow diagram of temporal filtering with local neighborhood limitations in accordance with a preferred embodiment of the present invention.

Referring to FIG. 2, a functional flow diagram of a temporal filtering method 130 with local neighborhood limitations is shown in accordance with a preferred embodiment of the present invention. The method (or process) 130 may be performed by the circuit 102. The method 130 generally comprises a step (or state) 132, a step (or state) 134, and a step (or state) 136. The steps 132-136 may be implemented in hardware, software, firmware or any combination thereof in an apparatus (or circuit or device). The sequence of the steps is shown as a representative example. Other step orders may be implemented to meet the criteria of a particular application.

A signal (e.g., REF) may be received by the step 132. The signal REF may convey all or a portion of one or more reference pictures buffered in the memories (e.g., the memory 110). A signal (e.g., CUR) may be received by the step 132 and the step 134. The signal CUR generally carries all or a portion of a current picture in a sequence of pictures. A signal (e.g., INIT) may be generated by the step 132. The signal INIT may carry an intermediate set of samples. One or more signals (e.g., USER INPUTS) may be received by the step 134 and the step 136. The signals USER INPUTS generally contain one or more parameters used in limiting the amount of excursion of a target sample value. A signal (e.g., RANGE) may be generated by the step 134 and presented to the step 136. The signal RANGE may identify a range of values used to limit the target sample value. A signal (e.g., FINAL) may be generated and presented by the step 136. The signal FINAL generally conveys a final limited value of the target sample.

The circuit 102 may perform an initial motion compensated filter operation in the step 132 on a local neighborhood in a current picture around the target sample. Current samples of the current picture in the local neighborhood around the target sample may be received in the signal CUR. One or more corresponding sets of reference samples from one or more reference pictures may be received via the signal REF. The motion compensated temporal filtering generally estimates a motion of the local neighborhood (or area) around the target sample relative to the reference pictures to find one or more respective motion vectors. The motion vectors are subsequently used to motion compensate all or portions of the reference pictures to generate motion compensated reference areas corresponding to the target local neighborhood. The motion compensated reference areas may have integer pixel positions, half-pixel positions, quarter-pixel positions and/or eighth-pixels positions. The motion compensated reference areas (or the motion compensated reference samples) may be blended with the target area (or the target sample) based on motion scores. The blending generally reduces noise in the target area/target sample. The resulting filtered/blended (or intermediate) target sample value may be presented in the signal INIT.

In the step 134, the circuit 102 generally performs a search in the local neighborhood of the current picture around the to-be-filtered target sample in the current picture. The search may be designed to find (or compute) a minimum value and a maximum value of the current samples of the current picture in the local neighborhood (or area). The signal USER INPUTS may control a size and/or a shape of the neighborhood. For example, the signal USER INPUTS may be used to select among a 3×3 area, a 5×5 area, a 7×7 area, a 5×7 area, a 9×9 area, and the like. By way of example, in the case of a 5×5 area, the step 134 may find the minimum value and the maximum values of the 25 samples around the to-be-filtered target sample.

In the step 136, the circuit 102 may limit the degree to which the final target sample value may go outside the minimum value/maximum value range determined (or bounded) by the step 134. The signal USER INPUTS may control an extent to which the range is extended (or stretched) above the maximum value and/or below the minimum value. For example, the user inputs may increase the top end of the range by an offset value (e.g., B) and decrease the bottom end of the range by another offset value (e.g., A). In some environments, the offset values A and B may be fixed amounts. By way of example, the original range generated by the step 134 may be [min, max]. The step 136 may expand the range to be [min−A, max+B]. In some situations, the offset value A matches the offset value B and the extended (or limited) range is symmetrical about the original minimum/maximum range. In other situations, the offset value A is limited differently and separately than the offset value B so the extended range is asymmetrical about the original range.

Figure 3:
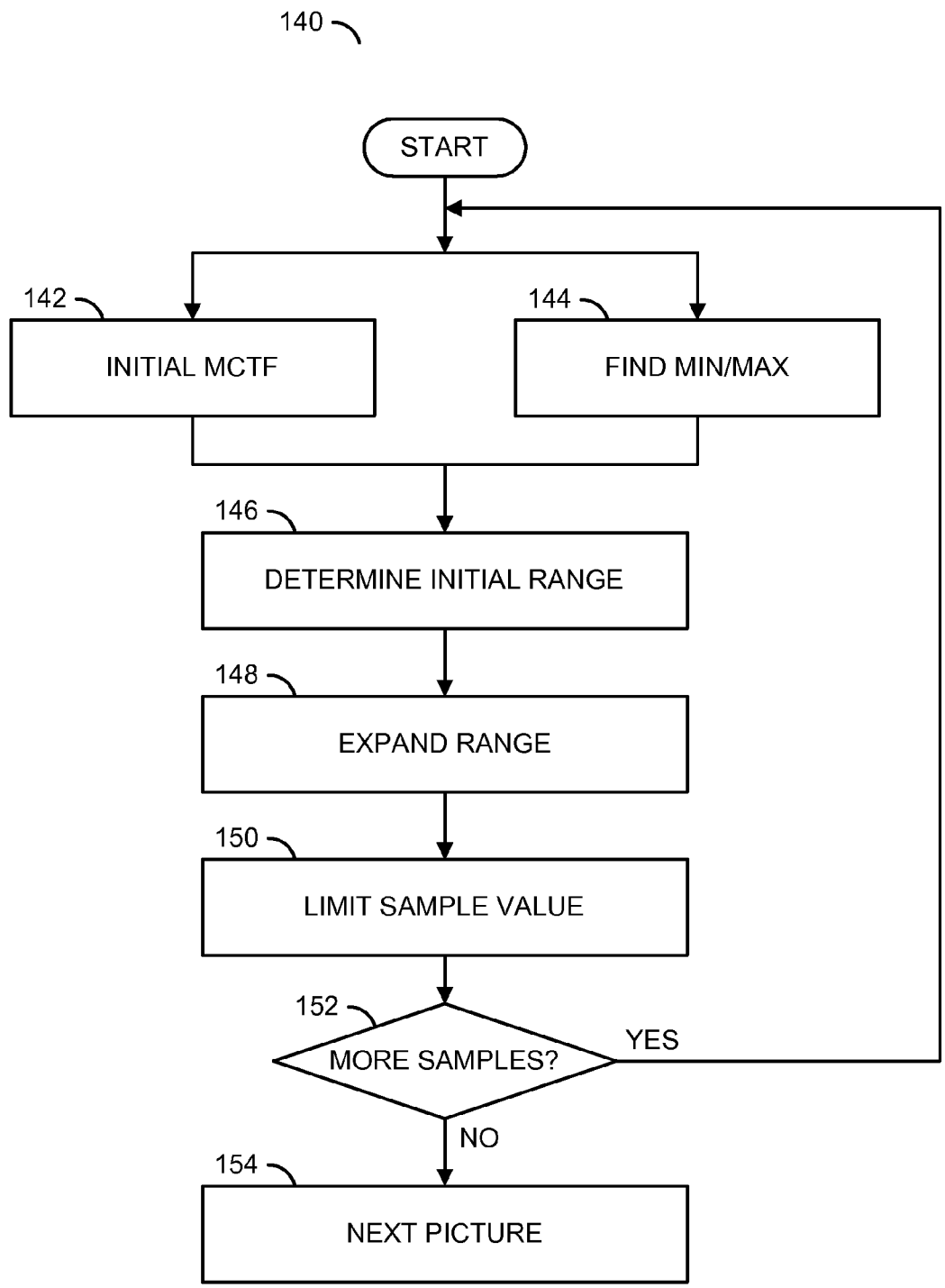
FIG. 3 is a detailed flow diagram for the temporal filtering.

Referring to FIG. 3, a detailed flow diagram of an example method 140 for the temporal filtering with the local neighborhood limitations is shown. The method (or process) 140 may be performed by the circuit 102. The method 140 generally comprises a step (or state) 142, a step (or state) 144, a step (or state) 146, a step (or state) 148, a step (or state) 150, a decision step (or state) 152, and a step (or state) 154. The steps 142-154 may be implemented in hardware, software, firmware or any combination thereof in an apparatus (or circuit or device). The sequence of the steps is shown as a representative example. Other step orders may be implemented to meet the criteria of a particular application.

In some embodiments, the method 140 may start with the step 142 and the step 144 performed in parallel (or simultaneously), as shown. In other embodiments, the steps 142 and 144 may be performed sequentially. The step 142 may compute an intermediate target sample value by performing an initial MCTF operation to temporal filter the local area relative to the one or more reference pictures. Each current picture generally has multiple samples (or pixels) arranged in a two-dimensional array. The step 144 may find the minimum value and the maximum value of the samples in the current picture in the local neighborhood around the target sample. Once the local minimum and the maximum values have been found, the circuit 102 may determine the initial (e.g., minimum/maximum) range in the step 146. In the step 148, the circuit 102 may use the user selected offset values A and B to either expand (or modify) the initial range, or maintain the initial range (e.g., A=B=0). The resulting limited range may be an expanded variation of the initial minimum/maximum range In the step 150, the circuit 102 may adjust (or alter) the intermediate target sample value to be within the extended (or modified) range generated in the step 148. In various embodiments, the adjustments may include a floor operation to increase small intermediate target sample values up to the bottom of the extended range. A ceiling operation may be used to reduce large target sample values down to the top of the extended range. Where the intermediate target sample value is already inside the extended target range, the step 150 may copy the intermediate target sample value to create a final target sample value. The step 150 may present the adjusted (or copied) final target sample value in the signal FINAL (see FIG. 2).

A check may be performed in the decision step 152 to determine if any more target samples exist in the current picture. If more target samples have yet to be processed, the method 140 may move to the next unprocessed target sample and return to the start. Once all of the target samples in the current picture have been processed, the method 140 may continue in the step 154 with the target samples in the next picture.

In various embodiments, generation of the extended range from the original range [min, max] may be determined by the step 148 as follows:

M=initial target sample value after MCTF operation.
Min=minimum value of samples in local neighborhood.
Max=maximum value of samples in local neighborhood.
M1=maximum(min−A, M) temporary value.
Final target sample value=minimum(max+B, M1).

In some designs, the method 140 may be iterated more than once with different offset values for A and B in the different iterations.

Figure 4:
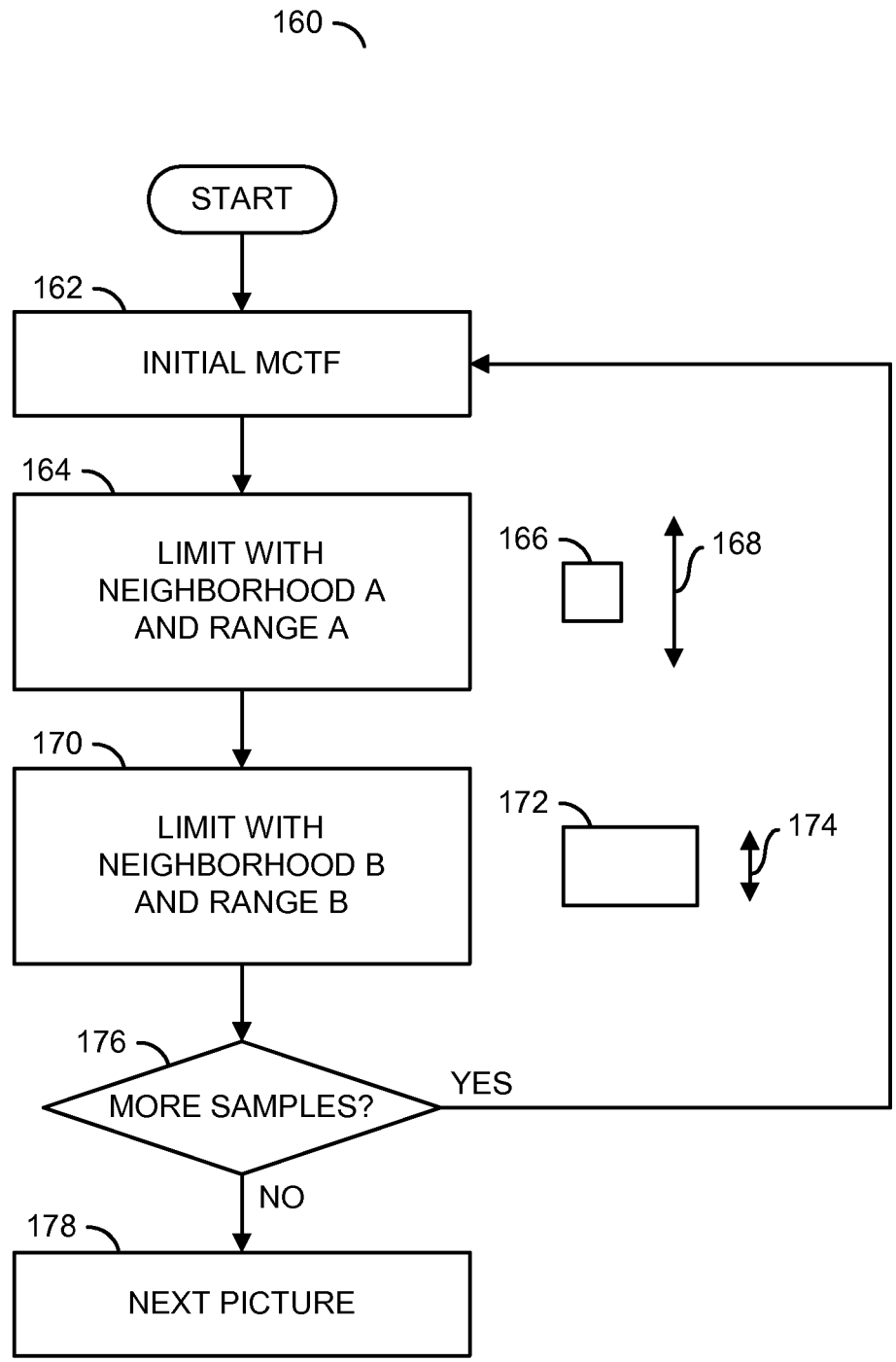
FIG. 4 is a flow diagram of a multiple-iteration method for the temporal filtering.

Referring to FIG. 4, a flow diagram of an example multiple-iteration method 160 for temporal filtering is shown. The method (or process) 160 may be performed by the circuit 102. The method 160 generally illustrates a two-iteration method. The method 160 generally comprises a step (or state) 162, a step (or state) 164, a step (or state) 170, a decision step (or state) 176, and a step (or state) 178. The steps 162-178 may be implemented in hardware, software, firmware or any combination thereof in an apparatus (or circuit or device). The sequence of the steps is shown as a representative example. Other step orders may be implemented to meet the criteria of a particular application.

In the step 162, the circuit 102 may perform an initial MCTF operation on an initial target sample, similar to the MCTF operation in the step 142. In the step 164, the intermediate target sample value may be limited based on an initial local neighborhood size and shape (e.g., a square area 166) and an initial extended range (e.g., an initial range 168). The resulting target sample value may be used as the initial target sample value in a subsequent iteration in the step 170. In the step 170, the target sample value may be limited again using a different local neighborhood (e.g., a rectangular area 172) and a different range (e.g., a range 174). The local areas 166 and 172 generally have different sizes and optionally different shapes to take into account different characteristics of the surrounding samples. The modified ranges 168 and 174 may also cover different spans to account for the characteristics of the surrounding samples. For example, the step 164 may use a small neighborhood with large excursions and the step 170 may use a large neighborhood with smaller excursions (as shown). In other situations, the step 164 may use a big neighborhood with small excursions (e.g., a 5×5 neighborhood with offset values A=B=0). The step 170 may use a smaller neighborhood with bigger excursions (e.g., a 3×3 neighborhood with offset values A=B=10). After the last iteration, the final target sample value may be presented in the signal FINAL.

A check may be performed in the decision step 176 to determine if any more target samples exist in the current picture. If more target samples have yet to be processed, the method 160 may move to the next unprocessed target sample and return to the start. Once all of the target samples in the current picture have been processed, the method 160 may continue in the step 178 with the target samples in the next picture.

Figure 5:
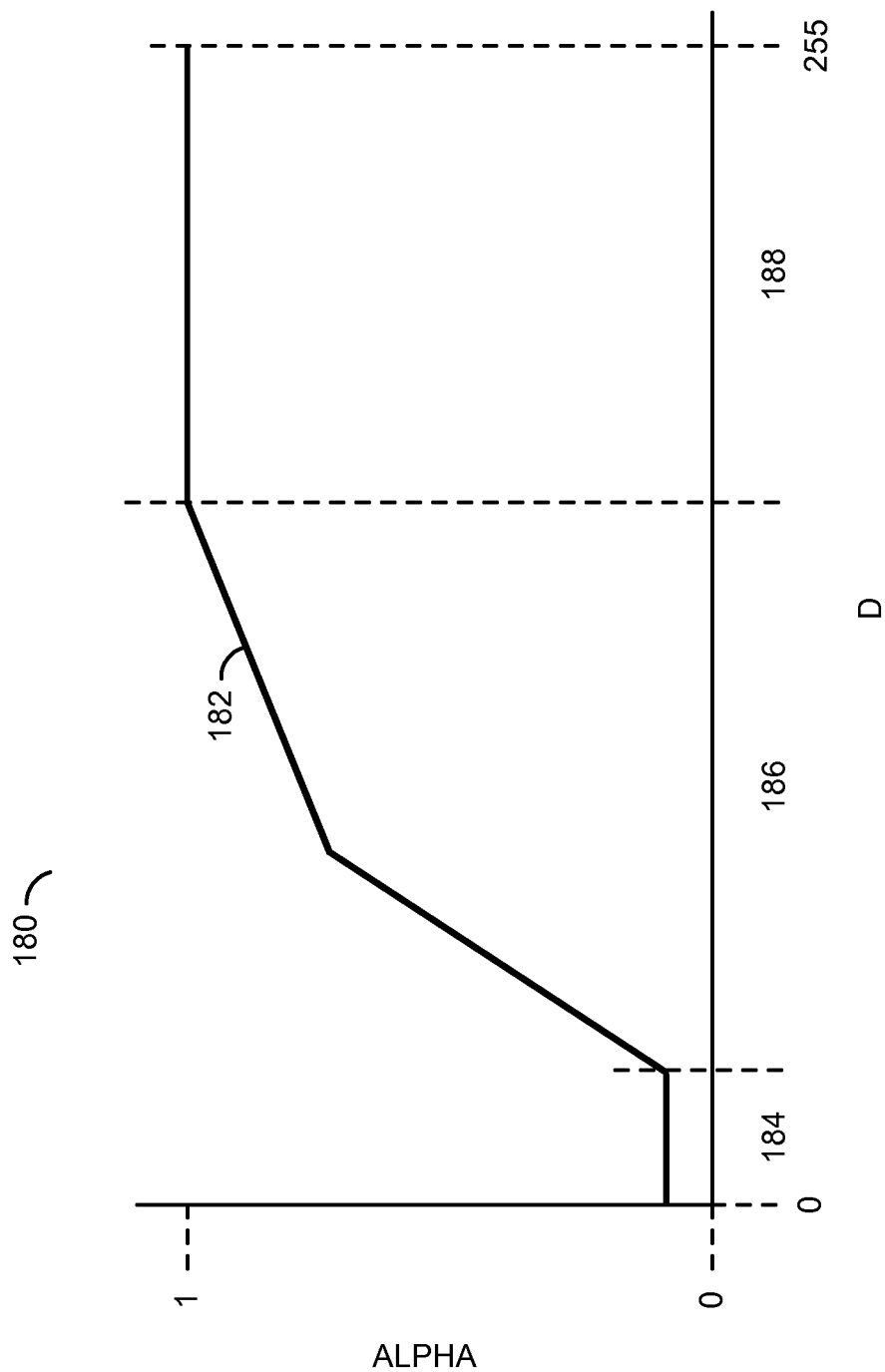
FIG. 5 is a diagram of a blending curve.

Referring to FIG. 5, a diagram 180 of an example blending curve 182 is shown. A strength of the temporal filtering (or blending) may be a continuum for the MCTF steps (e.g., the steps 132, 142 and/or 162). The diagram 180 generally illustrates a range of medium filter strengths and multiple (e.g., two) fixed filter strengths. A degree of filtering may depend on the blending curve 182.

An example blending may be determined as follows:
T=target (current) sample;
R=reference (previous) sample;
D=absolute value of difference (T−R); and
Alpha (curve 182)=lookup of the value D.

A filtered result (sample) may be calculated by formula 1 as follows:

$$\text{Result} = (\text{Alpha} \times T) + ((1 - \text{Alpha}) \times R) \tag{1}$$

In the diagram 180, the X axis generally represents the absolute difference value D. For 8-bit samples, the X axis may be labeled from 0 to 255. The Y axis generally represents the alpha value and ranges from 0 (zero) to 1 (unity). Other ranges of D and alpha may be implemented to meet the criteria of a particular application.

Small difference values D are illustrated in the section 184. The section 184 generally results in a low value of alpha per the blending curve 182. Medium (or intermediate) difference values D are illustrated in the section 186. The section 186 generally results in a range of values for alpha per the blending curve 182. Large difference values D are illustrated in the section 188. The section 188 generally results in a high value of alpha per the blending curve 182.

Where slow or no motion is detected between the target sample/local area and the reference picture, the absolute different value D is small and in the section 184. Therefore, the value alpha is small (and optionally a fixed value). Per formula 1, the small value of alpha weights the blending to favor the reference sample, or in some cases (e.g., alpha=0.5) averages the reference sample with the target sample. Such blending may be considered a strong filtering. Where medium motion is detected, the value D is medium and in the section 186. Therefore, the value alpha is medium. Per formula 1, the medium value alpha variably weights the blending between the target sample and the reference sample, depending on the level of motion. Such blending may be considered a medium filtering. Where fast motion is detected, the value D is large and in the section 188. Therefore, the value alpha may be large and weights the blending to favor the target sample. Such blending is generally considered a weak filtering. Where the value alpha=1, no filtering may be accomplished and the target sample is unchanged.

The functions and structures illustrated in the diagrams of FIGS. 1-5 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for temporal filtering with local neighborhood limitations, comprising the steps of:
    (A) performing a temporal filter operation on a target sample in a current picture of a sequence of pictures to generate an intermediate value of said target sample using a circuit;
    (B) finding a minimum value and a maximum value among a plurality of local samples in a local neighborhood in said current picture around said target sample, wherein said minimum value and said maximum value bound a minimum/maximum range; and
    (C) adjusting said intermediate value toward said minimum/maximum range using said circuit to generate a final value of said target sample if said intermediate value is outside a limited range, wherein said limited range is based on said minimum/maximum range.

2. The method according to claim 1, wherein (i) said limited range is an expanded variation of said minimum/maximum range and (ii) said adjusting of said intermediate value generates said final value in said limited range.

3. The method according to claim 1, wherein said adjusting of said intermediate value sets said final value to said intermediate value if said intermediate value is inside said limited range.

4. The method according to claim 1, further comprising the steps of:
    adding a first offset to said maximum value; and
    subtracting a second offset from said minimum value.

5. The method according to claim 1, further comprising the steps of:
    finding a different minimum value and a different maximum value in a different neighborhood in said current picture around said target sample to establish a different range;
    modifying said different range to generate a modified range; and
    adjusting said final value into said modified range.

6. The method according to claim 5, wherein (i) said different neighborhood is larger than said local neighborhood and (ii) said modified range is expanded less than said limited range.

7. The method according to claim 5, wherein (i) said different neighborhood is smaller than said local neighborhood and (ii) said modified range is expanded greater than said limited range.

8. The method according to claim 1, wherein said adjusting of said intermediate value generates (i) a temporary value as a maximum of (a) said minimum value minus a first offset value and (b) said intermediate value and (ii) said final value as a minimum of (a) said maximum value plus a second offset value and (b) said temporary value.

9. The method according to claim 8, further comprising the steps of:
    setting said first offset value to a zero value or greater; and
    setting said second offset value to said zero value or greater.

10. An apparatus comprising:
    a circuit configured to receive a sequence of pictures; and
    a processor configured to (i) perform a temporal filter operation on a target sample in a current picture of said sequence of pictures to generate an intermediate value of said target sample, (ii) find a minimum value and a maximum value among a plurality of local samples in a local neighborhood in said current picture around said target sample, wherein said minimum value and said maximum value bound a minimum/maximum range, and (iii) adjust said intermediate value toward said minimum/maximum range to generate a final value of said target sample if said intermediate value is outside a limited range, wherein said limited range is based on said minimum/maximum range.

11. The apparatus according to claim 10, wherein (i) said limited range is an expanded variation of said minimum/maximum range (ii) said adjustment of said intermediate value generates said final value in said limited range.

12. The apparatus according to claim 10, wherein said adjustment of said intermediate value sets said final value to said intermediate value if said intermediate value is inside said limited range.

13. The apparatus according to claim 10, wherein said processor is further configured to (i) add a first offset to said maximum value and (ii) subtract a second offset from said minimum value.

14. The apparatus according to claim 10, wherein said processor is further configured to (i) find a different minimum value and a different maximum value in a different neighborhood in said current picture around said target sample to establish a different range, (ii) modify said different range to generate a modified range, and (iii) adjust said final value into said modified range.

15. The apparatus according to claim 14, wherein (i) said different neighborhood is larger than said local neighborhood and (ii) said modified range is expanded less than said limited range.

16. The apparatus according to claim 14, wherein (i) said different neighborhood is smaller than said local neighborhood and (ii) said modified range is expanded greater than said limited range.

17. The apparatus according to claim 10, wherein said adjustment of said intermediate value generates (i) a temporary value as a maximum of (a) said minimum value minus a first offset value and (b) said intermediate value and (ii) said final value as a minimum of (a) said maximum value plus a second offset value and (b) said temporary value.

18. The apparatus according to claim 17, wherein said processor is further configured to (i) set said first offset value to a zero value or greater and (ii) set said second offset value to said zero value or greater.

* * * * *